(12) United States Patent
Prohofsky

(10) Patent No.: US 11,269,537 B2
(45) Date of Patent: Mar. 8, 2022

(54) SOFTWARE CONTAINERS WITH SECURITY POLICY ENFORCEMENT AT A DATA STORAGE DEVICE LEVEL

(71) Applicant: Seagate Technology LLC, Cupertino, CA (US)

(72) Inventor: Thomas R. Prohofsky, Edina, MN (US)

(73) Assignee: Seagate Technology LLC

( * ) Notice: Subject to any disclaimer, the term of this patent is extended or adjusted under 35 U.S.C. 154(b) by 31 days.

(21) Appl. No.: 16/189,422

(22) Filed: Nov. 13, 2018

(65) Prior Publication Data

US 2020/0004451 A1  Jan. 2, 2020

Related U.S. Application Data

(60) Provisional application No. 62/691,837, filed on Jun. 29, 2018.

(51) Int. Cl.

| G06F 12/00 | (2006.01) |
|---|---|
| G06F 3/06 | (2006.01) |
| G06F 8/60 | (2018.01) |
| G06F 21/60 | (2013.01) |
| G06F 9/455 | (2018.01) |

(Continued)

(52) U.S. Cl.
CPC .......... *G06F 3/0647* (2013.01); *G06F 3/0604* (2013.01); *G06F 3/0659* (2013.01); *G06F 3/0679* (2013.01); *G06F 8/60* (2013.01); *G06F 9/45558* (2013.01); *G06F 21/602* (2013.01); *G06F 2009/45583* (2013.01)

(58) Field of Classification Search
CPC .... G06F 3/0647; G06F 3/0604; G06F 3/0679; G06F 8/60; G06F 21/602; G06F 9/45558; G06F 3/0659; G06F 2009/45583
See application file for complete search history.

(56) References Cited

U.S. PATENT DOCUMENTS

| 5,631,961 A * | 5/1997 | Mills ..................... H04L 9/0866 380/28 |
| 7,334,125 B1 * | 2/2008 | Pellacuru ................ H04L 9/083 380/277 |

(Continued)

FOREIGN PATENT DOCUMENTS

| CN | 105069353 A | 11/2015 |
| KR | 20170067118 A | 6/2017 |

*Primary Examiner* — Mark A Giardino, Jr.
(74) *Attorney, Agent, or Firm* — Hall Estill Law Firm

(57) ABSTRACT

Method and apparatus for managing software containers in a computer network. A data storage device has a non-volatile memory (NVM) and a controller circuit. A portion of the NVM is allocated for use during deployment of a software container during which an application in the software container is executed by a processor of a virtual machine (VM) hypervisor. A unique session key is generated for the software container, and a token derived from the session key is supplied with each host access command issued to the data storage device during the deployment of the software container. The controller circuit validates each received host access command by determining the session key is valid and that a predetermined time period since deployment has not expired. The controller circuit is further configured to store in a session log a listing of all data blocks accessed in the NVM during the session.

20 Claims, 6 Drawing Sheets

(51) Int. Cl.
 *G06F 13/00* (2006.01)
 *G06F 13/28* (2006.01)

(56) References Cited

U.S. PATENT DOCUMENTS

| | | |
|---|---|---|
| 8,495,356 B2 | 7/2013 | Ashok et al. |
| 2008/0034113 A1* | 2/2008 | Montero .............. H04N 21/812 |
| | | 709/238 |
| 2009/0119644 A1* | 5/2009 | de Vries ................ H04L 65/604 |
| | | 717/123 |
| 2013/0311295 A1 | 11/2013 | Belby et al. |
| 2014/0007087 A1 | 1/2014 | Scott-Nash et al. |
| 2014/0108639 A1 | 4/2014 | Nelke et al. |
| 2016/0182549 A1 | 6/2016 | Bachar et al. |
| 2017/0052807 A1 | 2/2017 | Kristiansson et al. |
| 2017/0201490 A1 | 7/2017 | Kinder et al. |
| 2018/0006886 A1 | 1/2018 | Dhanakshirur et al. |
| 2018/0013738 A1* | 1/2018 | Yoo ....................... H04L 63/061 |

* cited by examiner

HOST ACCESS COMMAND FORMAT

SOLID STATE DRIVE (SSD) STORAGE CONTAINER APPLIANCE

HARD DISC DRIVE (HDD)/HYBRID DRIVE STORAGE CONTAINER APPLIANCE

SOFTWARE CONTAINERS WITH SECURITY POLICY ENFORCEMENT AT A DATA STORAGE DEVICE LEVEL

RELATED APPLICATION

The present application makes a claim of domestic priority to U.S. Provisional Patent Application No. 62/691,837 filed Jun. 29, 2018, the contents of which are hereby incorporated by reference.

SUMMARY

Various embodiments of the present disclosure are generally directed to data storage systems that deploy software containers in a virtualized environment.

In some embodiments, a data storage device has a non-volatile memory (NVM) and a controller circuit. A portion of the NVM is allocated for use by a software container having an application executed by a host device to store and retrieve container data associated with the application. The software container has a unique session key generated responsive to deployment of the software container, the session key being valid over a predetermined time period. The controller circuit is configured to transfer the container data between the portion of the NVM and the host device responsive to access commands supplied by the host device during the execution of the application, with each access command including a token derived using the unique session key. The controller circuit authorizes the transfer of the container data with the portion of the NVM for a selected access command responsive to verification of the token in the selected access command.

In further embodiments, a system is provided for deploying software containers in a processing environment. The system has a plurality of data storage devices each with a storage device controller circuit and a non-volatile memory (NVM). A container manager circuit is configured to deploy a software container in a virtual machine environment and to assign, to the deployed software container, a unique session key and a corresponding elapsed time period over which the session key remains valid. A processor circuit is adapted to issue access commands to the data storage devices to transfer data between a processor memory and an allocated portion of the NVM of each selected data storage device responsive to execution, by the processor circuit, of an application of the software container. Each access command includes a token derived using the session key. The storage device controller circuit of the selected data storage device authorizes servicing of each of the access commands received from the processor circuit having the token prior to expiration of the elapsed time period.

In further embodiments, a method includes steps of assigning a unique session key to a software container and an associated elapsed time interval; deploying the software container in a host device to commence execution of an application stored in a memory by a processor circuit of the host device at a beginning of the elapsed time interval; issuing a host access command to a data storage device to request a transfer of data between the memory of the processor circuit and an allocated portion of a non-volatile memory (NVM) of the data storage device, the host access command comprising a token derived using the session key; evaluating the token of the host access command using a controller circuit of the data storage device; and using the controller circuit of the data storage device to authorize the transfer of data associated with the host access command responsive to validation of the token as being derived from the session key during the evaluating step.

These and other features and advantages of various embodiments of the present disclosure can be understood from a review of the following detailed description in conjunction with the accompanying drawings.

DETAILED DESCRIPTION

Figure 1:
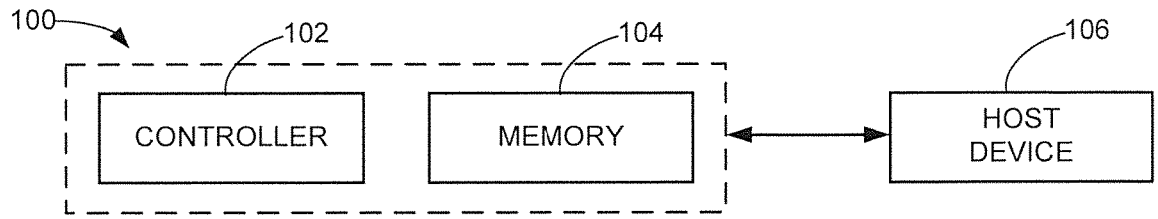
FIG. 1 is a functional block diagram of a data storage device configured and operated accordance with some embodiments.

The present disclosure is generally directed to data processing systems, and more particularly to providing storage device level data security during the deployment of software containers in a computer networked environment.

Data storage devices ("drives") store and retrieve user data in a fast and efficient manner. A data storage device generally includes a top level controller circuit and a non-volatile memory (NVM). The controller circuit operates to store user data to, and retrieve the user data from, the NVM.

The NVM can take any number of forms, including solid state semiconductor memory (e.g., flash, etc.) and rotatable recording media (e.g., rotatable magnetic recording discs, etc.). Data storage devices are often used in distributed computer networks to provide mass data storage capabilities for various users.

Data security schemes are implemented in data storage devices to prevent or reduce the ability of an unauthorized party from gaining access to stored data. A variety of data security schemes have been implemented in the art, including the use of data encryption to encrypt data sets stored to the NVM and authentication processes to authenticate users or devices attempting to access individual storage devices.

In a shared storage environment, data sets from multiple entities (e.g., different users, host devices, processes, etc.) are stored to the same storage device or group of storage devices. The data sets may be arranged as a number of host addressable blocks with virtual or logical addresses such as logical block addresses (LBAs) over a selected range or volume. Each data set can be encrypted using a separate encryption key to individually protect the data blocks and reduce the likelihood that another party can gain unauthorized access to an individual user's data set.

So-called software containers are becoming increasingly common as a vehicle for executing software applications in computer networks. Generally, a software container can be defined as a lower granularity virtual machine (VM) unit with virtualized networking, processing and storage requirements. A container provides a highly portable unit in which an application (e.g., an executable program, etc.) and associated elements reside that can be loaded to and executed in many different operational environments.

Rather than loading an entire VM, a container can utilize existing kernels or other aspects of the host (hypervisor) system that executes the application and, as required, supply additional modules needed during execution of the application. Software containers thus provide a number of operational advantages and efficiencies.

Current generation container ecosystems often employ a number of operational layers to create and deploy the containers, such as optimization layers, scheduling layers, deployment engines, etc. Because optimizers seek to level load system resources, many containers may be concurrently deployed across a population of data storage devices to provide the data storage requirements for the associated applications in the containers.

The shared utilization of physical storage by multiple containers has been found useful in achieving the required data transfer rates and other storage related resources for the applications. However, executing multiple containers across a set of data storage devices can provide data security vulnerabilities. For example, once a band or zone of a data storage device has been unlocked by one process, the device will respond to all requests for the data stored in that band or zone that appear to originate from an authorized user or process within the associated trust boundary. This can provide an attack vector whereby an adjacent container or other attacking process can gain access to data currently being processed by a selected container by spoofing or imitating the selected container.

Current generation container management systems are generally configured to provide container data security by applying top-level tracking and control of container accesses. This tracking is often provided at the file system level, so that individual block accesses at the storage device level are not directly monitored. To the extent that security policy enforcement is carried out at an upstream or remote server, such top-level security enforcement operations can also place a large demand on network communications during the monitoring process.

Various embodiments of the present disclosure are generally directed to an apparatus and method for providing storage device level security in a software container environment. As explained below, some embodiments include the use of a data storage system having a number of data storage devices to provide data storage in a computer network. Each storage device has a storage device controller circuit and a non-volatile memory (NVM).

A container manager circuit is configured to deploy a software container in a virtual machine environment. The manager circuit assigns, to the deployed software container, a unique session key that is valid for the container session. A predetermined elapsed time period during which the session key remains valid may also be assigned by the manager circuit at this time.

The software container is deployed such that a processor circuit executes an application in the software container. During this execution, the processor circuit will, from time to time, issue access (e.g., read, write, etc.) commands to the data storage devices to transfer data between the NVM of the storage devices and a local processor circuit memory. Each access command includes a token derived from the session key assigned by the container manager circuit. The token may be a copy of the session key itself, or may be derived using a cryptographic function that involves the session key. Other information, such as container keys or the assigned time period for the session key, may be transferred as part of the access commands as well.

The storage device controller of each data storage device will authorize the servicing of each received access command based on a valid token corresponding to the authorized session key. In at least some cases, an authorized session key is determined to be valid as being issued by a process associated with an authorized container, as well by a determination that the predetermined elapsed time period for the container session has not yet elapsed.

In further embodiments, each storage device will generate and maintain an internal session log that indicates all data transfer activity at the block level. The session log may include a listing of all data blocks by logical address that were accessed (or were attempted to be transferred), during the session. An audit agent can be used to monitor and analyze the session logs across multiple devices to provide an overall record of all accesses during the session to the various data sets stored by the data storage devices, by such as by data block, device, time, etc.

The various embodiments allow multiple software containers to be safely deployed and concurrently executed across a plurality of storage devices. No data blocks will be stored or released by a storage device unless the session key is determined to be valid for the current session.

The session key, container key, and other authentication elements can take any number of suitable forms and may also be referred to as certificates, hashes, leases, etc. It is contemplated that the keys will be generated and authenticated using any number of available cryptographic processes. Communications of the keys and other data across the network can be encrypted or otherwise protected against discovery by a monitoring process. In this way, a system is provided that allows container level security to be created during orchestration and scheduling in the layer doing the physical storage mapping of the container logical storage, with the drive checking and enforcing access entitlement on every transaction.

These and other features and advantages of various embodiments can be understood beginning with a review of FIG. 1 which provides a functional block representation of an exemplary data storage device 100. The device 100 includes a controller 102 and a memory 104. The controller 102 is a control circuit that provides top level control of data transfer operations between the memory 104 and a host device 106.

The controller 102 may be realized as a non-programmable hardware based control circuit and/or one or more programmable processors that execute programming (e.g., firmware) stored in a local memory. The memory 104 includes one or more forms of non-volatile memory (NVM) to store the user data. Examples include but are not limited to solid state semiconductor memory, rotatable memory, etc. The host device 106 is configured to communicate with the storage device 100 using a suitable interface protocol and may take the form of a computer, a server, a RAID controller, etc.

Figure 2:
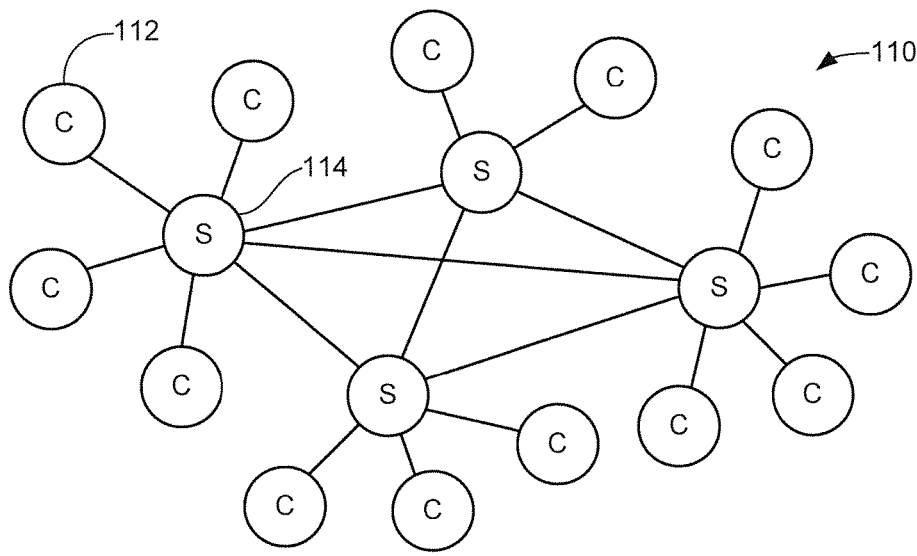
FIG. 2 is a distributed network in which data storage devices such as from FIG. 1 can be used in accordance with some embodiments.

FIG. 2 shows a distributed computer network 110 that can implement various data storage devices 100 and host devices 106 from FIG. 1. The network 110 includes various interconnected nodes including client (C) nodes 112 and server (S) nodes 114. Any number of network connection forms and protocols can be used to allow each node to communicate with other nodes in the network. Examples include Internet nodes, public and private cloud environments, enterprise systems, data centers, etc. It is contemplated that the network 110 in FIG. 2 is configured to execute applications in the form of software containers.

Figure 3:
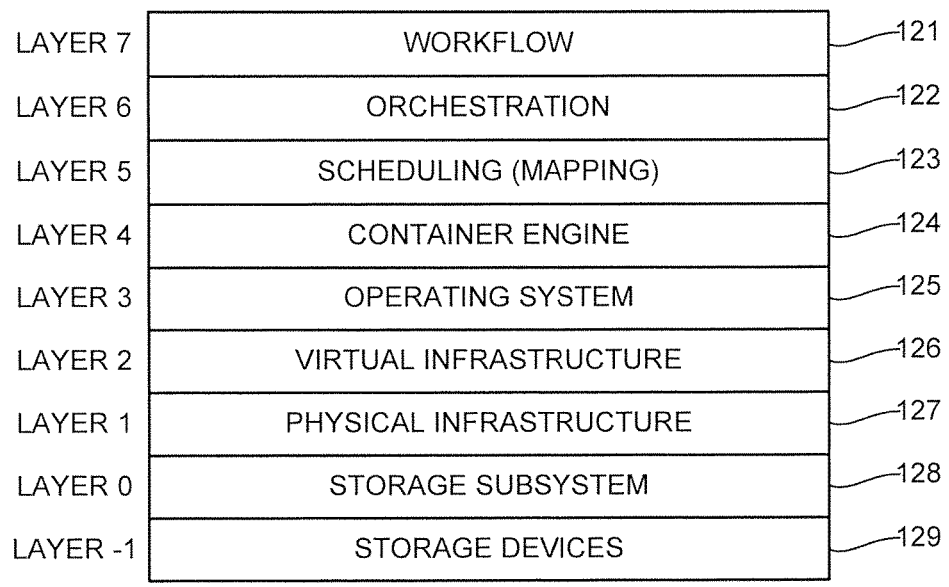
FIG. 3 depicts various layers of a container ecosystem in which software containers are deployed in the network of FIG. 2.

FIG. 3 provides a generalized container ecosystem arrangement (stack) 120 useful in creating and deploying software containers in accordance with various embodiments of the present disclosure. It will be appreciated that other arrangements, including arrangements that consolidate some or all of these layers, are contemplated. In particular, at least some embodiments push many of these functions to the subsystem or data storage device level, as well be explained below.

Overall, the stack 120 can be characterized in some embodiments as a PaaS (platform as a service) system of cloud computing services to enable developers to create and deploy various applications in the network 110. The stack 120 extends from a top layer (layer 7) to a bottom layer (layer −1), with greater levels of physicality and locality provided lower in the stack. The respective layers represent software, virtualization and hardware as required. Some layers, or portions thereof, may be realized using open source or proprietary software modules commercially available from a variety of sources.

A workflow layer 121 represents workflow generation tools useful in generating a particular application. An orchestration layer 122 (layer 6) provides an orchestrator function to accumulate and define the service needs for the application, including network, processing and storage requirements. In some embodiments, various system policies are established at this layer including security, quality of service (QOS), availability, etc.

A scheduling (mapping) layer 123 (layer 5) generally operates to match the requirements identified by the orchestrator to specific system resources. A logical volume may be mapped to a number of physical extents to define a physical volume group. One or more container engines 124 (layer 4) deploy the various containers when activated, including performing a pull of needed web services (e.g., Apache, PHP, etc.).

An operating system 125 (layer 3) represents the underlying host OS of the processor resources that execute the application. A Linux OS can be suitable in some cases, although other forms may be used. Execution may be carried out using a virtual machine (VM) arrangement.

Layers 2 and 1 in the stack 120 provide virtual and physical infrastructure 126, 127 respectively for the processing environment. A storage subsystem 128 (layer 0) may represent a group of data storage devices (such as at a server storage node, FIG. 2) with an associated server or host device as required. A drive layer 129 (layer −1) represents the physical data storage devices, as depicted in FIG. 1. It is contemplated that the various policies for the container developed at the orchestration layer are enforced at the drive layer, as explained below.

Figure 4A:
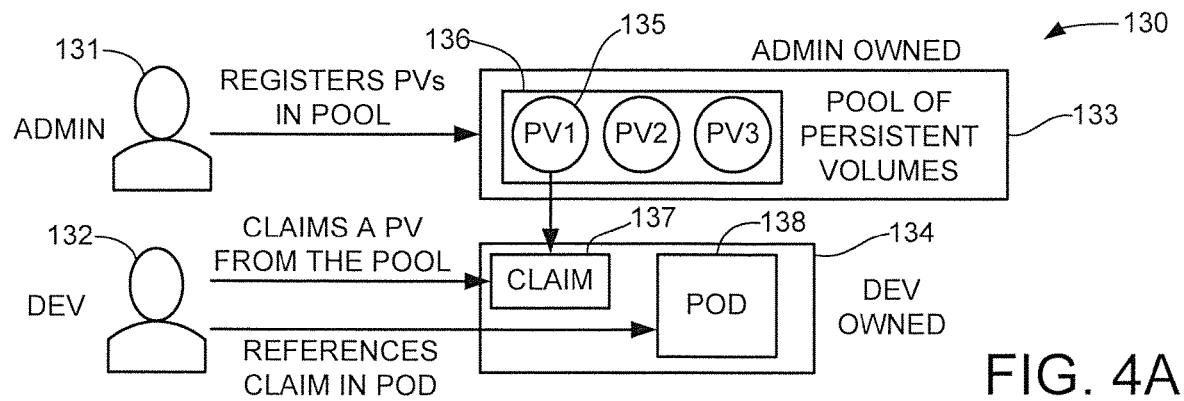
FIG. 4A shows a process flow diagram to illustrate entities involved in the generation and deployment of containers in accordance with some embodiments.
Figure 4B:
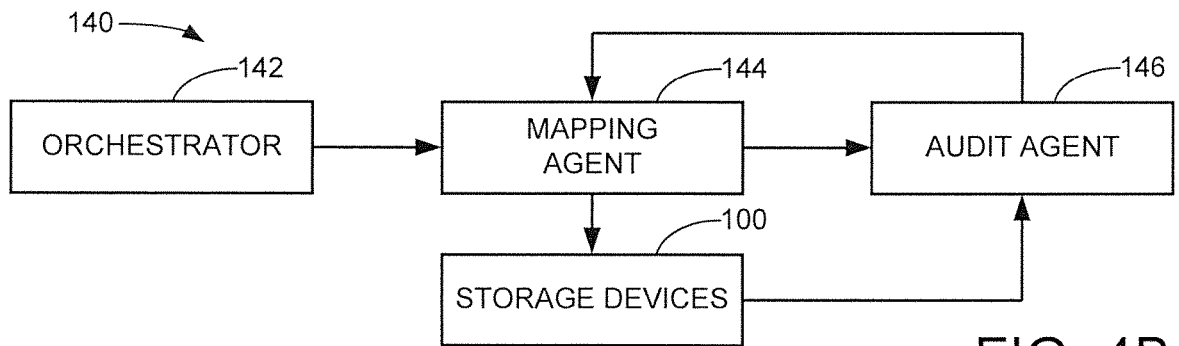
FIG. 4B is a software container management system constructed and operated in conjunction with the process flow diagram of FIG. 4A in some embodiments.

FIGS. 4A and 4B show various entities involved in the creation, deployment, growth and termination of software containers in accordance with various embodiments. FIG. 4A shows an input sequence 130, and FIG. 4B shows an arrangement of a software container management system 140. Each will be discussed in turn.

FIG. 4A shows two humans associated with the process, although these can be automated in some situations using a programmable processor with associated programming, an AI structure, etc. These individuals include an administrator (admin) 131 and a developer (dev) 132. The admin 131 represents individual(s) primarily responsible for supplying network resources 133 under the ownership and control of the admin. The developer 132 represents the individual(s) primarily responsible for creating and deploying the container within space 134 owned by the developer. It will be appreciated that the developer and admin personnel communicate with the process using appropriate interface (e.g., computing) tools.

As represented in FIG. 4A, the admin 131 registers various persistent volumes (PVs) 135 within a pool 136. The PVs represent available physical resources including network, data storage and processing resources. The developer 132 makes a claim 137 upon one (or more) of the PVs 135, and references the claim(s) 137 in a pod 138, which represents the arrangement of elements of the container being deployed.

The software container management system 140 of FIG. 4B is also referred to as a container management circuit and includes an orchestrator 142, a mapping agent 144 and an audit agent 146. The orchestrator 142 represents a hardware based and/or programmable processor based circuit that executes the orchestration functions of FIG. 3; the mapping agent 144 constitutes a hardware/processor based circuit that performs the scheduling and container engine operations of FIG. 3 to provide the required logical to physical mapping; and the audit agent 146 is another hardware/processor based circuit that carries out block level auditing of containers, and may correspond to the storage subsystem or other layers as required.

With regard to mapping, it will be appreciated that many containers of the present generation tend to use virtual block device mapping to physical chunks of the allocated drives through a suitable file system (such as a file's consecutive 512B storage representing a drive sector map to physical devices through an INODE structure) or through block level virtualization (such as hardware or software RAID). Some embodiments presented herein are generally designed to extend the security and policy attributes through software RAID, but INODE and other storage object arrangements can be used as well.

Figure 5:
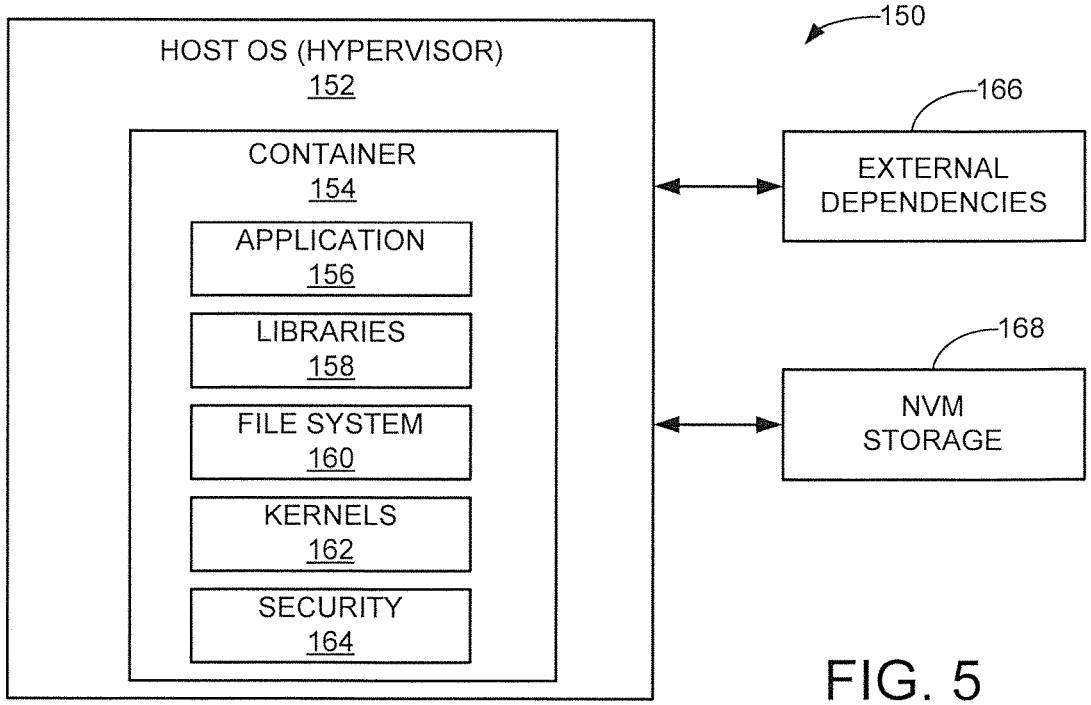
FIG. 5 is a functional representation of an exemplary container in a deployed environment.

FIG. 5 illustrates a processing environment 150 for a container generated and deployed by the system of FIGS. 4A and 4B. A host OS (hypervisor) 152 provides processing resources to execute a container 154 loaded for that purpose. The container 154 can have a variety of elements, such as one or more software applications 156 constituting software programs executed by the hypervisor. As required, the application(s) 156 may utilize other resources such as libraries 158, a file system 160, OS kernels 162 specially configured to support execution of the application(s), and a security module 164 that manages security functions during execution as explained below.

A typical container such as 154 will generally require and use processing, network and data storage resources. In some cases, external modules ("dependencies") such as 166 may be loaded or otherwise accessed from other locations within the network during processing. NVM storage 168 is allocated for use. While not limiting, it is contemplated that slices or portions of storage from many dozens or even hundreds of storage devices 100 may be allocated for use by the container 154. It follows that each of the storage devices 100 may be concurrently servicing multiple containers at a given time.

Figure 6:
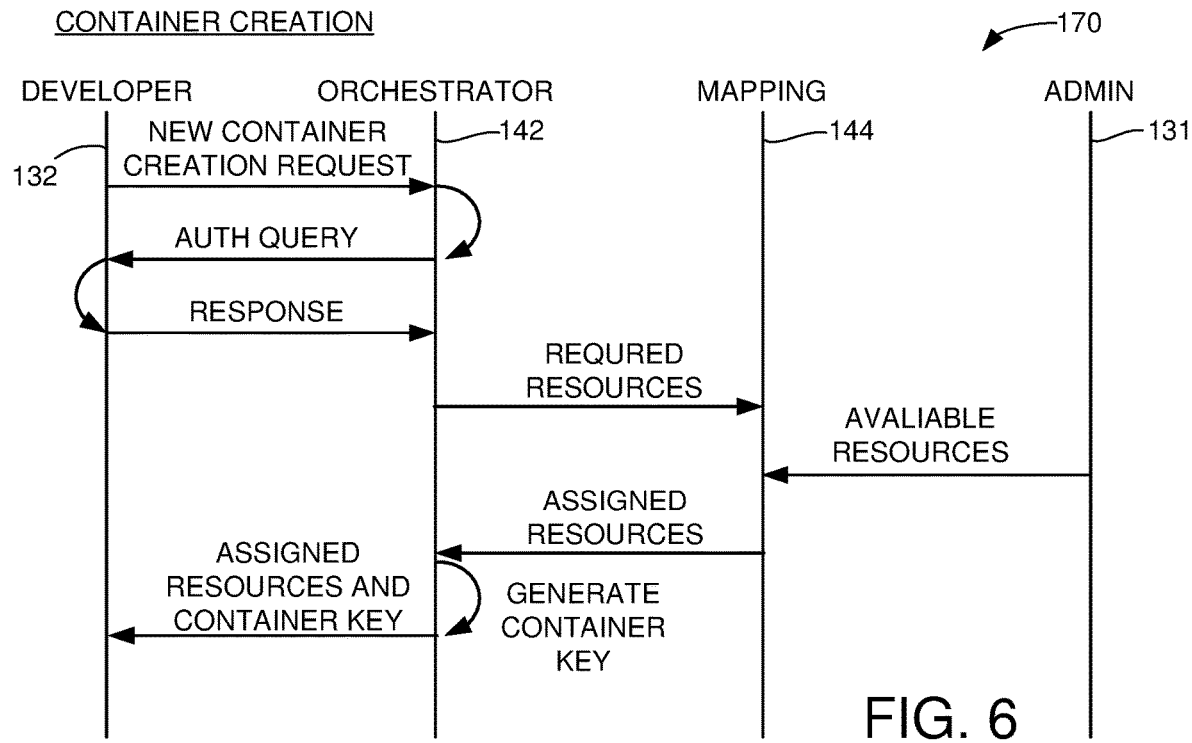
FIG. 6 is a timing diagram to illustrate a manner in which software containers may be created using the management system of FIG. 4.

FIG. 6 provides a timing sequence diagram 170 to illustrate steps carried out by the management system 140 of FIGS. 4A and 4B to create a new container such as the container 154 in FIG. 5. The various steps are merely exemplary and are not limiting. Other steps may be carried out during the container creation process depending on the requirements of a given application.

Various interactive entities are depicted in FIG. 6, including the developer 132, the orchestrator 142, the mapping agent 144 and the admin 131 from FIGS. 4A-4B. The sequence in FIG. 6 commences with a request from the developer to generate a new container. In some cases, the developer may be operating on behalf of another party or entity referred to as a tenant. While not separately shown in the diagram, the tenant (if used) is the overall owner of the process, data, etc. being implemented by the developer. For example, a tenant may be a global corporation with an established web presence, in which case the developer may be an agent of the global corporation that has been authorized to develop a web based application for execution on behalf of the corporation. In this case, the developer may have received authentication credentials from the tenant.

The request to create the container is forwarded by the developer to the orchestrator, which proceeds with an authentication security exchange with the developer. This may include one or more query/response cycles in which the developer presents credentials which are evaluated by the orchestrator. The authentication process can take any number of forms and may include the application of one or more cryptographic processes. Challenge values, hashes, signed certificates, etc. may be exchanged. Regardless of form, a trust boundary is established between the developer and the orchestrator as a result of a successful authentication process.

As part of the new container creation request, certain required resources will be communicated to the orchestrator. The resources represent networking, processing and data storage requirements necessary to provide a particular performance during the execution of the container. Examples include network data transfer rates, processing IOPS, total data storage capacity (e.g., total number of LBAs of available storage, etc.), etc. Other forms of resources can be identified as well.

The required resources are supplied to the mapping agent 144, which also receives data from the admin 174 indicating the available resources in the network that can be used to satisfy the required resources (e.g., the PVs 135 from pool 136). In response, the mapping agent operates to assign the resources to be used by the container, which are forwarded to the orchestrator. The assigned resources may be geographically distributed in various remote locations. To achieve certain levels of performance, various processing hypervisors and portions of storage devices may be identified as part of the container infrastructure. As part of this mapping operation, the mapping agent may use the logical volume manager (LVM2) toolset from the Linux or other system to convert the required logical volume (e.g., LBA 0 to LBA Max) of the container to physical extents (e.g., "chunks of drives") of a volume group.

In at least some embodiments, the orchestrator further operates to generate a unique container key that is associated with the container. The container key can take any number of suitable forms, and may be generated using a cryptographic function such as an encryption algorithm, a hash function, etc. The container key, also referred to herein as a token, hash, certificate, etc., provides a unique identifier (ID) value for the container. While not limiting, the container key is used during each deployment of the container in the allocated environment. The container key, as well as other security information, may be stored as part of the security module portion of the container (see 164, FIG. 5).

Figure 7:
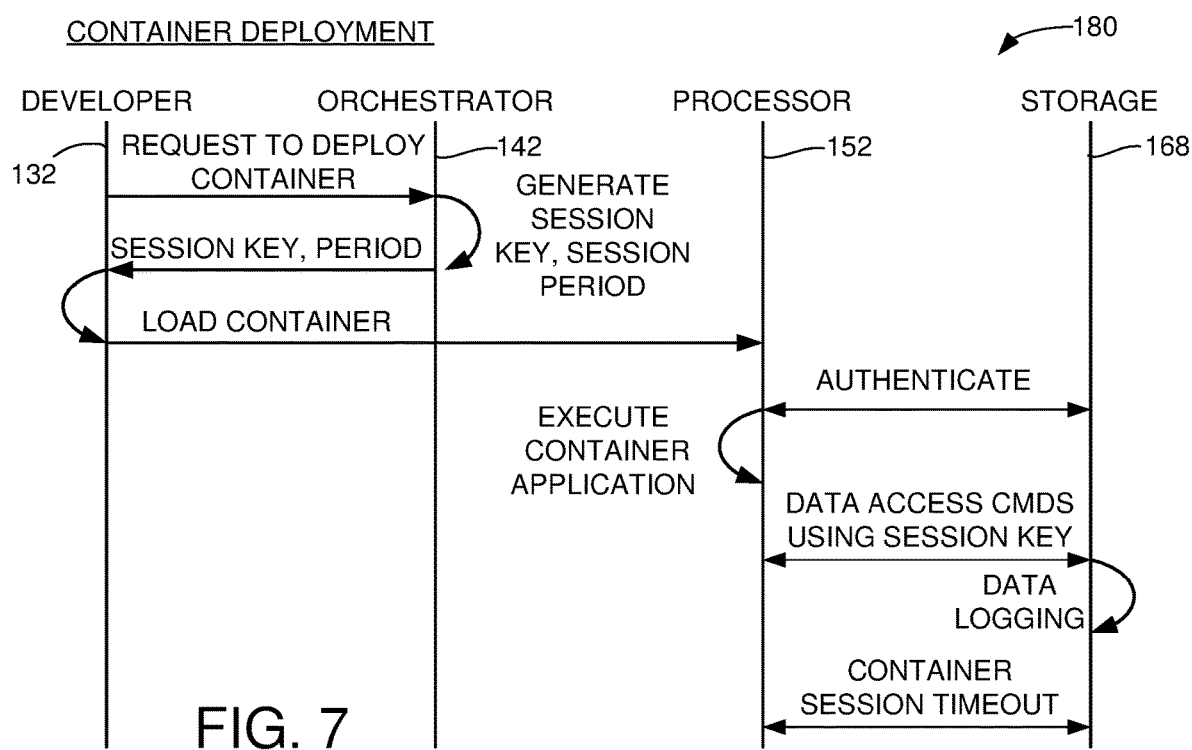
FIG. 7 is a timing diagram to illustrate a manner in which software containers may be subsequently deployed using the management system of FIG. 4.

FIG. 7 provides a sequence diagram 180 to cover deployment of the container created in FIG. 6. The two diagrams may be combined as a single process, although it is contemplated that once created, a container may be deployed (e.g., loaded and executed) multiple times as required, hence the use of separate diagrams. Other operations may be applied to an existing container as well, such as an expansion of the requirements of (e.g., to "grow") the container, in which case a similar process as was described in FIG. 6 may be applied to an already existing container.

The entities shown in FIG. 7 include the developer 132 and orchestrator 142 from FIG. 6, as well as a local processor unit corresponding to the hypervisor 152 and storage corresponding to the NVM 168 in FIG. 5. As before, this is merely illustrative and not limiting, as other entities and processes may be invoked as required.

The sequence in FIG. 7 includes an initial request to deploy (e.g., load and execute) the container. This request is forwarded from the developer 132 to the orchestrator 142. While not shown, a trust boundary may be initially established between the developer and the orchestrator in a manner similar to that described above in FIG. 6. In response to the valid request to deploy the container, the orchestrator 142 generates a unique session key and, in at least some cases, generates or otherwise identifies a predetermined elapsed time interval (time period) during which the session key is valid. These elements are conveyed back to the developer as shown.

The session key, also session hash, certificate, lease, etc., represents a unique ID value generated using a suitable cryptographic process that is applied to the deployment of the container. A new, different session key is generated and used each time a particular container is deployed.

FIG. 7 next shows the loading of the container to the local hypervisor processing environment. This results in the general configuration shown previously in FIG. 5, where the application(s) resident in the container are executed. As part of the loading process, a separate authentication process may be carried out among and between the various processing elements in the environment, including between the hypervisor and each of the data storage devices that make up the container NVM storage. As before, any number of authentication sequences can be used including the use of challenge values and responses, digital signatures, hashes, etc. This establishes a trust boundary in which the processor and storage devices can safely operate.

At this point, the hypervisor (host) proceeds to execute the container application. From time to time, host access commands will be issued by the host to the individual storage devices to transfer data between local memory of the host and the allocated portion of the NVM of the storage devices. The session key and, in at least some cases, the container key will be transferred as part of each host access command. The session key will be transferred in the form of a token that is derived from the session key. In some cases, the token will be a direct copy of the session key itself; in other cases, the token will represent the output of a cryptographic function applied to the session key and will thus constitute a series of bits that are different from the session key, but are representative of the session key. Similar processing can be applied to the container key as required.

In at least some cases, data logging will occur during the execution of the application. Such logging can occur at the data storage device level, at the host level, etc. The logging can include the read and write commands received, timing information associated with such commands, etc. Finally, at some point the container session will time out, such as by the container program being expressly terminated, by an encountered idle time, or the expiration of the predetermined time interval for the execution of the container.

Figure 8:
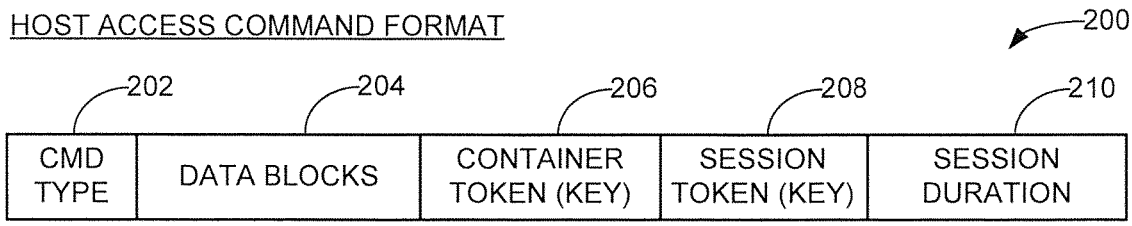
FIG. 8 shows an exemplary format for an access command issued to a storage device during deployment of the software container of FIG. 5 in some embodiments.

FIG. 8 provides a generalized format for a host access command 200 issued by the host processor 152 from FIG. 7. The format is merely illustrative as other formats can be used. It will be understood that the overall format will conform to the particular interface protocol utilized by the storage devices 100, including but not limited to SAS, SCSI, PCIe, NVMe, Ethernet, etc. The host access commands may be encrypted or otherwise secured to prevent decoding by an attacker as the commands are transferred between the host and the storage devices. As required, the responses supplied by the storage device back to the host may also take the same or similar format.

The exemplary format 200 includes a command type field 202, a data block field 204, a container token (key) field 206, a session token (key) field 208 and a session duration field 210. Other contents may be included in each command, but such are omitted for clarity. The command type field 202 indicates the type of command (e.g., write command, read command, status command, etc.), and the data block field 204 includes the logical addresses (e.g., LBAs, etc.) and, as necessary, the associated user data blocks. As discussed above, the exemplary fields 206 and 208 store respective container and session tokens, which are derived from the associated container and session keys.

As will be appreciated, a write command generally involves a command to write certain data blocks to the NVM of the associated storage device 100. A write command will thus include the addresses as well as the writeback data associated with the respective blocks. A read command generally involves a command to read back previously stored data, and will thus identify the range of blocks to be returned. A status command may be a request for status of a pending command that has not yet been fully satisfied.

As shown in FIG. 8, each host access command may be appended with a copy of the container token, the session token and the session duration. These values are evaluated by the storage device that receives the host access command, as will now be described in FIG. 9.

Figure 9:
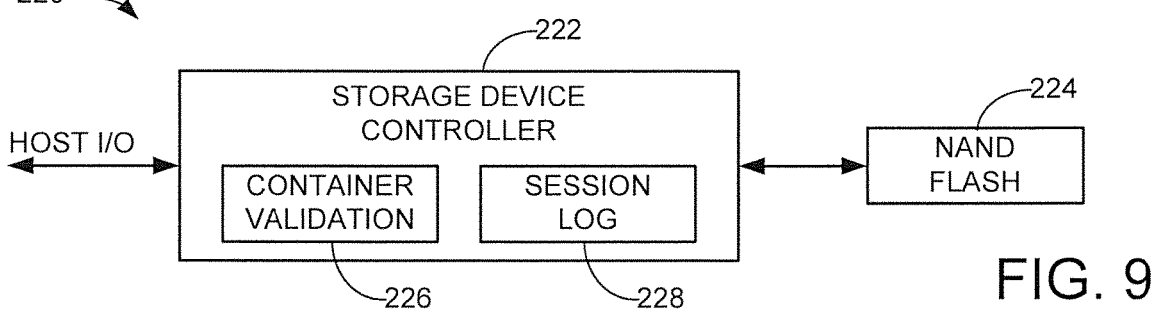
FIG. 9 is a functional block representation of a selected data storage device characterized as a solid-state drive (SSD) in some embodiments.

FIG. 9 shows a functional block representation of a solid-state drive (SSD) 220 corresponding to the data storage devices 100 described above in some embodiments. The SSD 220 includes a storage device controller circuit 222 and a NAND flash memory module 224. Other elements may be included such as a flash module back end, a host interface front end, etc. As before, the controller circuit 222 may be realized in one or more hardware circuits and/or programmable processors that execute programming (firmware) in a processor memory location.

The storage device controller circuit 222 includes a container validation circuit 226 and a session log data structure 228 maintained in local memory. The validation circuit 226 is used to evaluate and track the container key, session key and session duration information associated with each access command. To this end, the container validation circuitry may include hardware or software cryptographic functionality as required.

Figure 10:
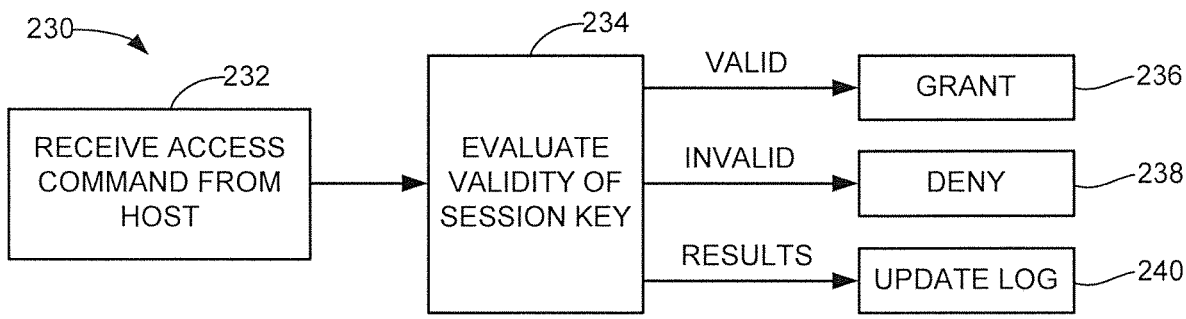
FIG. 10 is a process flow diagram to illustrate processing of access commands by the storage device of FIG. 9 in some embodiments.

FIG. 10 shows an access command processing sequence 230 carried out by the storage device controller 222 responsive to each host command issued by the host. Block 232 shows initial receipt of an access command from the host. The session key and other constituent elements of the access command such as the container key and the session duration information are extracted and evaluated by the validation circuit 226 at block 234.

Should the session key be determined to be valid (e.g., a valid session token is received), the flow passes to block 236 where access is granted and the command (e.g., read, write, etc.) is scheduled for execution by the SSD 220. If invalid, the execution of the command is denied, block 238. Denial of the execution of the access command may result in the communication of a notification to the requesting host device that the access command has been denied.

The evaluation results of each command are provided as updates the session log 228, as shown by block 240, to provide a listing, such as by logical address, all data blocks that were accessed (or were attempted to be accessed) during the session. The session log can include any number of types of useful information such as time stamps, keys, issuing processes, etc. associated with the various logical blocks of data stored in and retrieved from the NVM.

Validation of the session key can take place in a number of ways. It is contemplated that part of the authentication process to initially unlock that portion of the NAND flash 224 assigned for use by the container will include the transfer of certain information, including the session key, container key and session duration. This will link access of the data blocks stored by the SSD to a particular container, as well as to a particular session (deployment) of the container. Thereafter, each time an access command is received, the controller 222 will ensure that a valid session key has been used as the basis for the generation for the command before releasing (or storing) the data. This will tend to reduce the ability of an attacker from overwriting existing data or retrieving previously stored data. Side channel attacks such as from unauthorized status or query commands will also be reduced or thwarted.

In some embodiments, the presentation of a correct session key from an authorized process will not result in servicing of the command unless the storage device controller 222 further determines that the session time period has not expired. Denial of commands will be reported back to the requesting host or other processes. All block level grants and denials may be recorded in the session log 228 along with appropriate information such as time/date stamps, copies of commands, etc. as required to provide the appropriate granularity and level of detail.

Once the certificate (e.g., session key format) is understood as being secure by both the drive and the application, subsequent block level requests (e.g., access commands) are signed, tagged and/or encrypted in a manner that is validated by the drive for the allocated region. This could include a signature that uses the certificate as a seed for a hash function which includes time and LBA region requested. The signing and tagging can be carried out with, or without data encryption.

Figure 11:
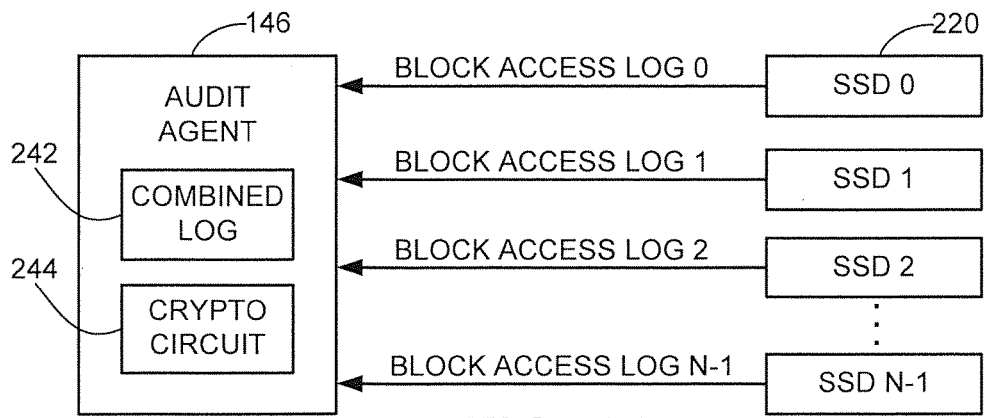
FIG. 11 shows operation of the audit agent of the management system in some embodiments.

FIG. 11 shows operation of the audit agent 146 during or at the conclusion of a deployed container session. It is contemplated that the NVM space 168 utilized by the container is provided by a plural number N SSDs 220. Each SSD maintains a separate session log for those access commands processed during the associated session. It is contemplated that the same session key will be used by each of the SSDs during the same session, but as desired individual session keys can be generated and used for each of the different SSDs during a given session.

As provided by FIG. 11, the audit agent requests, and receives, a separate block access (session) log from each of the SSDs, and combines these into a combined log 242 as a separate data structure in local memory. In this way, the developer or other authorized entity (e.g., a selected tenant, administrator, etc.) can be provided with the combined log to illustrate how the data were generated and used during the container session. This can be particularly helpful when evaluating suspected or confirmed security attacks or breaches. It will be noted that other security features and routines can be implemented by the container as well. However, the data supplied by the audit agent 146 in FIG. 11 is at the physical block level, which provides a level of information not available to the container itself.

Block chain technology or other cryptographic methods can be used to validate the integrity of the audit logging. For example, both the drive log information and the combined audit log information can be sequentially written and encrypted using a cryptographic circuit 244, such as a hardware based cryptographic circuit and/or a programmable processor with programming instructions stored in a memory to carry out a selected cryptographic function such as encryption using a selected encryption key, etc. When an audit is performed, the cryptographic processing of the log information will ensure that the logs are complete, no unauthorized accesses took place, etc. Similar cryptographic processing can be carried out at the storage device level using the storage device controller 222 (FIG. 9).

The embodiments discussed thus far have contemplated that at least some storage containers will be executed by a separate processor coupled to one or more storage devices, either locally or across a network. With further advances in computing capabilities, it is contemplated that containers may be executed within individual data storage devices, or groups of devices, without the need for external processing infrastructure.

Figure 12:
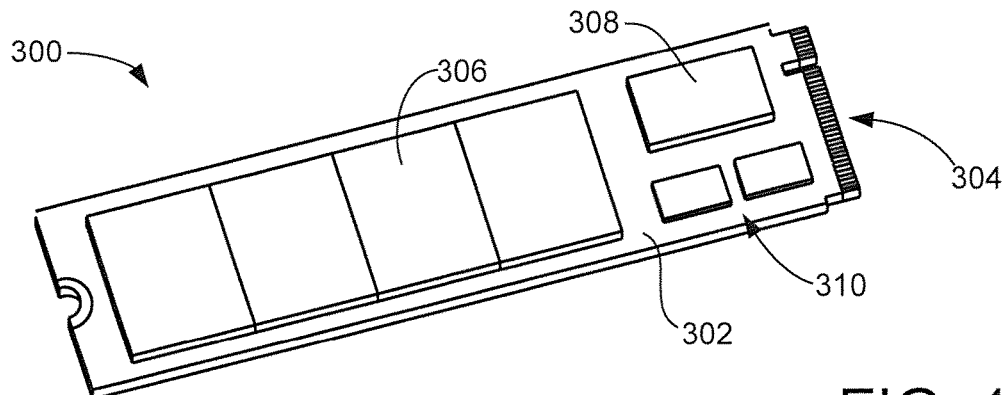
FIG. 12 is an isometric representation of a solid state drive (SSD) that can be configured to execute a software container in accordance with some embodiments.

FIG. 12 illustrates an SSD 300 similar to those discussed above that can be provided with such storage container deployment functionality. The SSD 300 is a plug-in module conforming to the M.2 SSD form factor standard. The SSD 300 uses non-volatile NAND flash as the NVM, although other forms of memory can be used including and not limited to NOR flash, EEPROM, STRAM, PCRAM, RRAM, etc.

As shown in FIG. 12, the SSD 300 includes a base printed circuit board (PCB) 302 with an edge connector 304 to communicate with an associated host via a host interface. NAND flash memory integrated circuits are denoted at 306, and an SOC 308 serves as the top level controller circuit. Additional circuits, such as DRAM, hardware encryption engine, etc. are generally represented by additional control circuit devices 310.

It will be noted that the SSD 300 may employ erasable flash memory such that each memory location generally requires application of a garbage collection operation to relocate current version data and apply an erasure (reset) operation before new data blocks can be written to the memory location. Accordingly, the portion of the SSD NVM that is allocated for use by a given software container may comprise a logical volume identified by LBAs or other logical addresses, but the physical locations in which the data are stored may be migrated from time to time as required by the workload of the SSD.

Figure 13:
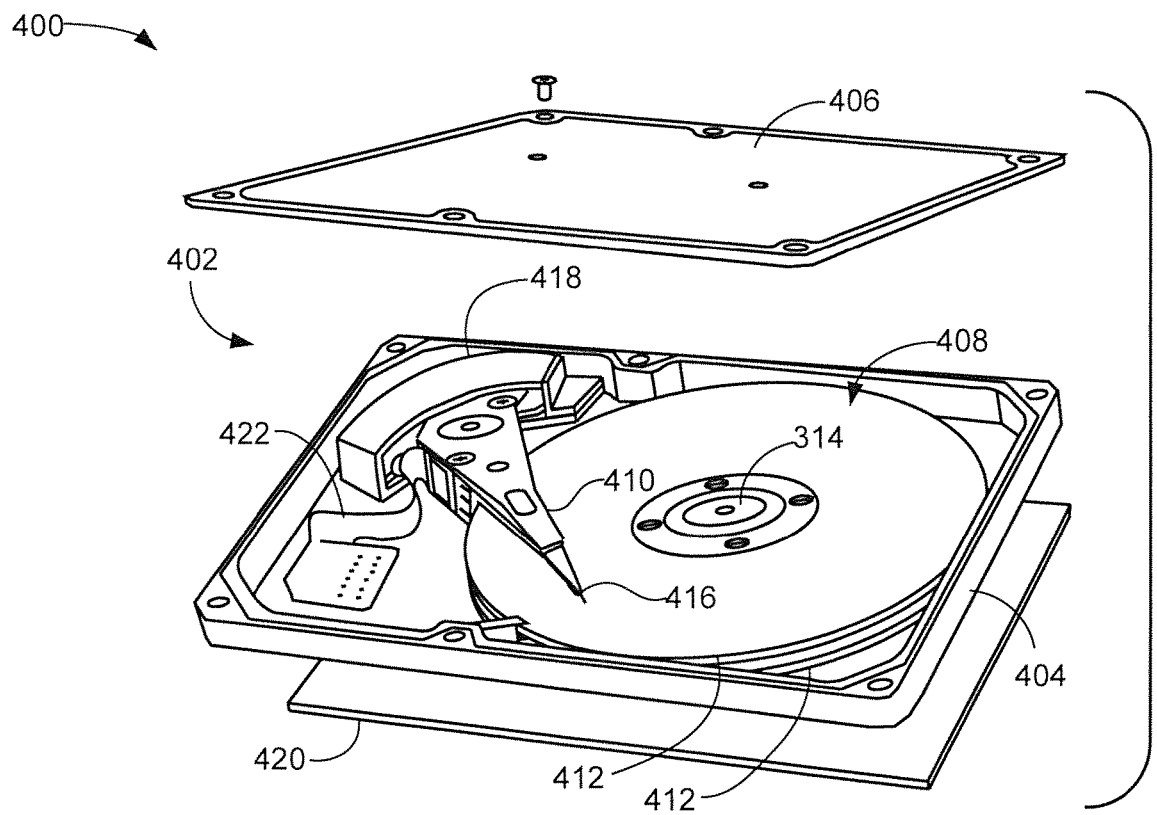
FIG. 13 is an isometric, exploded representation of a hard disc drive (HDD) or hybrid drive that can be configured to execute a software container in accordance with some embodiments.

Other forms of data storage devices can be configured as storage container appliances as well. FIG. 13 shows a data storage device 400 configured as a hard disc drive (HDD) or a hybrid drive with storage container functionality as discussed above. As will be recognized, the HDD 400 utilizes rotatable data recording media (discs) as at least a portion of the NVM store. A hybrid drive can use rotatable discs as well as another form of NVM memory, such as NAND flash.

The drive 400 includes an environmentally sealed housing 402 formed of a base deck 404 and top cover 406. Housed within the interior of the housing 402 is a disc stack 408 accessed by a rotary actuator 410. The disc stack includes a number of rotatable magnetic recording discs 412 (in this case, two) that are rotated at a constant high velocity by a spindle motor 414. The actuator 410 supports an array of data read/write transducers (heads) 416 adapted to write data to and read data from sectors arranged along concentric data tracks (not shown).

The actuator 410 is pivoted to advance the transducers 416 radially across the disc surfaces using a voice coil motor (VCM) 418. Control electronics, including circuitry corresponding to the controller 102 in FIG. 1 and the storage container hypervisor 142 may be supported on an externally mounted printed circuit board (PCB) 420. A flex circuit assembly 422 includes a bulkhead connector to enable the communication of power and data signals between the interior of the device and the external PCB.

Because the magnetic recording discs are rewritable, newly written data may be overwritten in place. It is therefore possible for disc-based memories such as 400 that the portion of the NVM allocated for use by a given storage container may map to a particular physical portion of the media. However, garbage collection, relocation of data, media caches, etc. may result in the data blocks being physically written to different locations, as with the SSD 300 discussed above.

The storage container functionality disclosed herein is memory agnostic, both as to form of the NVM as well as to the total storage capacity of the NVM. Generally, any individually addressable data storage device with NVM, a suitable controller circuit and a host interface can be configured to perform or support the storage container security processing of the present disclosure.

Figure 14:
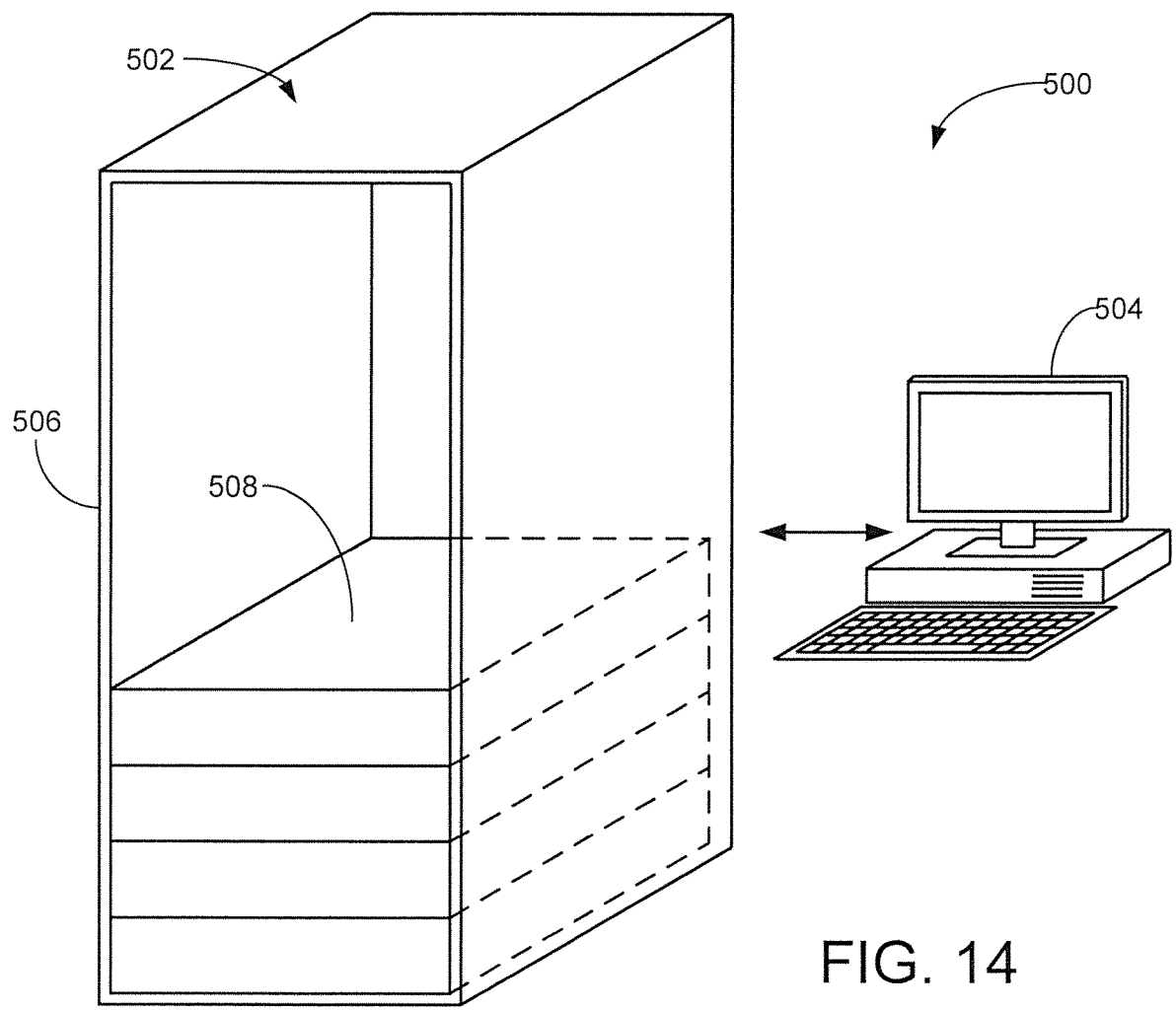
FIG. 14 shows a mass-storage system in which software containers can be deployed in accordance with further embodiments.

FIG. 14 is a schematic depiction of a data storage system 500 in which further embodiments of the present disclosure may be advantageously practiced. The data storage system 500 is a mass-data storage system in which a large population of data storage devices such as 100, 220, 300 and/or 400 are incorporated into a larger data storage space to provide a storage node as part of a larger geographically distributed network. Examples include a cloud computing environment, a network attached storage (NAS) application, a RAID (redundant array of independent discs) storage server, etc.

The system includes a storage assembly 502 and a computer 504 (e.g., server controller, etc.). The storage assembly 502 may include one or more server cabinets (racks) 506 with a plurality of modular storage enclosures 508. While not limiting, the storage rack 506 is a 42 U server cabinet with 42 units (U) of storage, with each unit extending about 1.75 inches (in) of height. The width and length dimensions of the cabinet can vary but common values may be on the order of about 24 in.×36 in. Each storage enclosure 508 can have a height that is a multiple of the storage units, such as 2 U (3.5 in), 3 U (5.25 in), etc. to accommodate a desired number of adjacent storage devices 100. The computer 504 can be a stand-alone workstation as shown, or integrated into the rack assembly 502.

Figure 15:
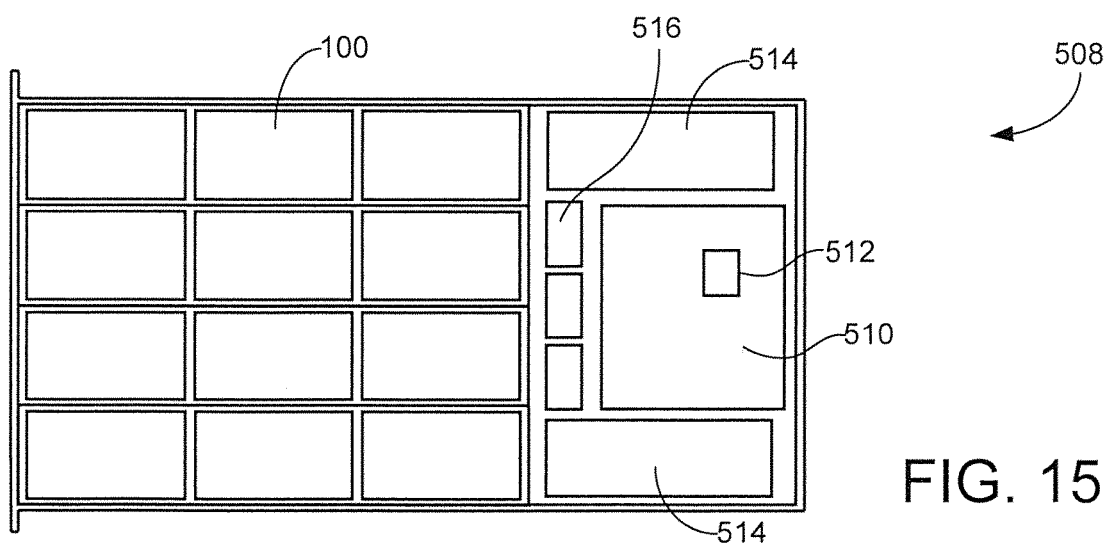
FIG. 15 depicts a storage enclosure of the storage system of FIG. 14 in some embodiments.

FIG. 15 is a top plan view of a selected storage enclosure 508 that incorporates 36 (3×4×3) data storage devices 100. Other numbers and arrangements of data storage devices 100 can be incorporated into each enclosure. The storage enclosure 508 includes a number of active elements to support the operation of the various storage devices, such as a controller circuit board 510 with one or more processors 512, power supplies 514 and cooling fans 516.

The modular nature of the various storage enclosures 508 is provided to permit removal and installation of each storage enclosure into the storage rack 506 including under conditions where the storage devices 100 in the remaining storage enclosures within the rack are maintained in an operational condition. In some cases, the storage enclosures may further be configured with access panels or other features along the outwardly facing surfaces to permit individual storage devices, or groups of devices, to be removed and replaced. Sliding trays, removable carriers and other mechanisms can be utilized to allow authorized agents to access the interior of the storage enclosures as required.

It follows that storage containers can be deployed throughout the rack system 502 using the local processors 512, and/or the local server 504, as the local hypervisor environments. The local processors/server can further carry out the optimizer, mapping and audit functions as well.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A data storage device comprising:
a non-volatile memory (NVM) having a portion allocated for use by a software container having an application executed by a host device to store and retrieve container data associated with the application, the software container having a unique session key generated responsive to deployment of the software container, the session key valid over a predetermined time period defined as a predetermined elapsed time interval; and
a data storage device controller circuit configured to transfer the container data between the portion of the NVM and the host device responsive to access commands supplied by the host device during the execution of the application, each access command including an indication of the predetermined time period and a token derived from the unique session key, the data storage device controller circuit authorizing the transfer of the container data within the portion of the NVM for a selected access command responsive to verification of the unique session key in the selected access command, extraction of the indication of the predetermined time period from the selected access command, and verification that the selected access command was received during the predetermined time period using the extracted indication of the predetermined time period.

2. The data storage device of claim 1, wherein the data storage device controller circuit verifies the unique session key for the selected access command by determining the unique session key forms a portion of the selected access command and by determining that the selected access command was received by the data storage device prior to a conclusion of the predetermined time period.

3. The data storage device of claim 1, wherein the data storage device controller circuit is further configured to deny the transfer of data with the portion of the NVM for a second selected access command responsive to the second selected access command not including the unique session key or responsive to the second selected access command including the unique session key but received, by the data storage device, after a conclusion of the predetermined time period.

4. The data storage device of claim 1, wherein the data storage device controller circuit is further configured to authorize the transfer of the container data with the portion of the NVM for the selected access command responsive to a determination that the selected access command further includes a unique container key, wherein a different session key is assigned to the software container each time that the software container is deployed, and wherein the same container key is used by the software container each time that the software container is deployed.

5. The data storage device of claim 1, characterized as a solid-state drive (SSD), the NVM comprising solid-state semiconductor memory.

6. The data storage device of claim 1, wherein the NVM comprises at least one rotatable data recording disc.

7. The data storage device of claim 1, wherein the data storage device controller circuit performs at least one cryptographic function to verify the session key in the selected access command.

8. The data storage device of claim 1, wherein the selected access command comprises a selected one of a read command to read data from the portion of the NVM, a write command to write data to the portion of the NVM, or a status command to obtain a status for a previously issued access command.

9. The data storage device of claim 1, wherein the data storage device controller circuit further generates a session log as a data structure in a local memory, the session log providing a list of each transfer of data blocks to or from the host device associated with the execution of the application.

10. The data storage device of claim 9, wherein the data storage device controller circuit further applies a selected cryptographic function to the session log.

11. The data storage device of claim 1, wherein the data storage device controller circuit comprises a hypervisor portion that executes an operating system to provide a virtual machine (VM) environment for execution of the application.

12. A system for deploying software containers in a processing environment, comprising:
- a plurality of data storage devices each having a storage device controller circuit and a non-volatile memory (NVM);
- a container manager circuit configured to deploy a software container in a virtual machine environment and to assign, to the deployed software container, a unique session key and a corresponding elapsed time period that defines a predetermined elapsed time interval over which the session key will remain valid, the container manager circuit conveying to the storage device controller circuit of each of the plurality of data storage devices the unique session key and the corresponding elapsed time period; and
- a processor circuit adapted to issue access commands to the data storage devices to transfer data between a processor memory and an allocated portion of the NVM of each selected data storage device responsive to execution, by the processor circuit, of an application of the software container, each access command comprising a token derived using the session key and an indication of the corresponding elapsed time period, the storage device controller circuit of the selected data storage device authorizing servicing of each of the access commands received from the processor circuit having the token based on a determination, by the storage device controller circuit of the selected data storage device, that the access commands were received by the selected data storage device prior to expiration of the elapsed time period responsive to extraction of the indication of the corresponding elapsed time period from the associated access command.

13. The system of claim 12, wherein the container manager circuit comprises an orchestrator circuit and a mapping circuit, the orchestrator circuit configured to generate the software container and to generate a different session key for each deployment of the software container during which the application is executed by the processor circuit, the mapping circuit configured to select the processor circuit and the portions of the NVM of each of the data storage devices for use during each deployment of the software container.

14. The system of claim 12, wherein each data storage device generates a separate session log as a data structure in a local memory that describes each transfer of data blocks with the associated portion of the NVM, and wherein the container manager circuit comprises an agent circuit configured to accumulate and combine the separate session logs from the data storage devices to form a combined log as a data structure in an audit circuit memory to provide a block level map of transfers of data blocks during the session.

15. The system of claim 14, wherein the agent circuit comprises a cryptographic circuit configured to apply a selected cryptographic function to the combined log to provide protected log data which are stored in a memory.

16. The system of claim 12, wherein each selected data storage device controller circuit verifies the unique session key for each selected access command received by the selected data storage device controller circuit by determining the unique session key and an indication of the predetermined time period each respectively forms a portion of the selected access command and by determining that the selected access command was issued to the data storage device prior to a conclusion of the predetermined time period.

17. The system of claim 12, wherein each access command issued to the data storage devices responsive to the deployment of the software container further incorporates information indicating a time at which the elapsed time period of predetermined duration will expire.

18. A method comprising:
- assigning a unique session key to a software container and an associated elapsed time interval;
- deploying the software container in a host device to commence execution of an application stored in a memory by a processor circuit of the host device at a beginning of the elapsed time interval, the deploying including communicating the session key and the elapsed time interval to a data storage device;
- issuing a host access command to the data storage device to request a transfer of data between the memory of the processor circuit and an allocated portion of a non-volatile memory (NVM) of the data storage device, the host access command comprising an indication of the associated elapsed time interval and a token derived from the session key;
- extracting the token and the indication of the elapsed time interval from the host access command using a controller circuit of the data storage device; and
- using the controller circuit of the data storage device to authorize the transfer of data associated with the host access command responsive to validation, by the controller circuit, that the extracted token was derived from the session key and that the host access command was received during the elapsed time interval using the extracted indication of the elapsed time interval.

19. The method of claim 18, wherein the token is generated by applying a cryptographic function to the session key, and wherein the validation of the token comprises extracting a copy of the session key from the token, determining an association between the extracted copy of the session key in the host access command and the software container, and determining that the host access command was issued prior to a conclusion of the elapsed time interval.

20. The method of claim 18, further comprising accumulating a session log as a data structure in a local memory of the data storage device comprising a list of data blocks by logical address in the allocated portion of the NVM that were accessed during the elapsed time interval, and forwarding the session log to the host device.

* * * * *